United States Patent
Lank et al.

(10) Patent No.: US 8,813,374 B2
(45) Date of Patent: Aug. 26, 2014

(54) CHAIN GUARD FOR A MOTOR-DRIVEN CHAIN SAW AND A CARRYING ARRANGEMENT THEREFOR

(75) Inventors: Jonas Lank, Korb (DE); Peter Stahl, Oppenweiler (DE); Helmut Zimmermann, Berglen (DE); Klaus-Martin Uhl, Plochingen (DE); Friedrich Hollmeier, Rudersberg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 1024 days.

(21) Appl. No.: 12/659,500

(22) Filed: Mar. 11, 2010

(65) Prior Publication Data

US 2010/0229405 A1    Sep. 16, 2010

(30) Foreign Application Priority Data

Mar. 11, 2009  (DE) .......................... 10 2009 012 291

(51) Int. Cl.
*B27B 17/00*    (2006.01)
*B23Q 13/00*    (2006.01)

(52) U.S. Cl.
CPC ............... *B23Q 13/00* (2013.01); *B27B 17/00* (2013.01)
USPC .............................. 30/381; 30/382; 30/296.1

(58) Field of Classification Search
USPC ........ 30/151, 286, 287, 381, 382, 296.1–298; 206/349; D3/220, 269; D8/65, 70; 224/220, 254
See application file for complete search history.

(56) References Cited

U.S. PATENT DOCUMENTS

| | | | | |
|---|---|---|---|---|
| 2,867,363 | A | * | 1/1959 | Knemmerling ............... 206/349 |
| 2,910,216 | A | * | 10/1959 | Bennett ......................... 206/223 |
| 3,042,087 | A | * | 7/1962 | Otoupalik ...................... 30/151 |
| 3,059,673 | A | * | 10/1962 | Woleslagle ..................... 30/382 |
| 3,129,731 | A | * | 4/1964 | Tyrrell ........................... 30/151 |
| 3,230,987 | A | * | 1/1966 | Woleslagle ..................... 30/161 |
| 3,326,250 | A | * | 6/1967 | Kephart, Jr. .................... 30/151 |
| 3,344,818 | A | * | 10/1967 | Musgrove ....................... 83/814 |
| 4,063,358 | A | * | 12/1977 | Hodge ............................. D8/65 |
| 4,090,298 | A | * | 5/1978 | Rushforth ....................... 30/368 |
| D248,422 | S | * | 7/1978 | Malcolm ....................... D3/269 |
| 4,143,460 | A | * | 3/1979 | Shean ............................. 30/382 |
| 4,190,955 | A | * | 3/1980 | Rushforth ...................... 30/366 |
| 4,211,003 | A | * | 7/1980 | Collins ........................... 30/162 |
| 4,263,714 | A | * | 4/1981 | Todd, Sr. ........................ 30/151 |

(Continued)

FOREIGN PATENT DOCUMENTS

| | | |
|---|---|---|
| JP | S6067058 U | 5/1985 |
| JP | S6159004 U | 4/1986 |

OTHER PUBLICATIONS

Partial English translation of the Office action of the Chinese Patent Office dated Aug. 26, 2013 in the corresponding Chinese patent application 201010144004.9.

*Primary Examiner* — Jason Daniel Prone
(74) *Attorney, Agent, or Firm* — Walter Ottesen P.A.

(57) ABSTRACT

A chain guard for a motor-driven chain saw has a narrow casing with a front end and a back end. The casing has two parallel side walls and an upper wall and a lower wall connecting the side walls to each other. The casing is closed at the front end thereof and defines an opening at the back end. A device is provided on the casing for attaching the chain guard to the clothing of the operator, a rope, a carabiner or the like.

18 Claims, 5 Drawing Sheets

(56) References Cited

U.S. PATENT DOCUMENTS

| | | | |
|---|---|---|---|
| 4,447,953 A * | 5/1984 | Lombardino et al. | 30/382 |
| 4,506,444 A | 3/1985 | Sundstroem | |
| 4,570,341 A * | 2/1986 | Konneker | 30/161 |
| 4,597,178 A * | 7/1986 | Dolata et al. | 30/138 |
| 4,615,117 A * | 10/1986 | Flath | 30/122 |
| 4,827,614 A * | 5/1989 | Mitchell | 30/151 |
| 5,002,213 A * | 3/1991 | Newton et al. | 224/232 |
| 5,119,937 A * | 6/1992 | Reynolds, Jr. | 206/349 |
| 5,156,156 A * | 10/1992 | Ruzich | 30/382 |
| 5,163,592 A * | 11/1992 | Newton et al. | 224/197 |
| D359,849 S * | 7/1995 | Griffin | D3/269 |
| 5,435,065 A * | 7/1995 | Raczykowski | 30/382 |
| 5,570,512 A * | 11/1996 | Hoppner | 30/383 |
| 6,138,363 A * | 10/2000 | Kawashima | 30/151 |
| 6,247,624 B1 * | 6/2001 | Rundberg | 224/220 |
| 6,299,040 B1 * | 10/2001 | Matias | 224/254 |
| 6,308,419 B1 * | 10/2001 | Neshat et al. | 30/151 |
| 6,389,700 B2 * | 5/2002 | Paquin | 30/382 |
| 6,427,333 B1 * | 8/2002 | Veltz et al. | 30/158 |
| 6,557,258 B1 * | 5/2003 | Roberts et al. | 30/1.5 |
| 6,637,112 B2 * | 10/2003 | Davis | 30/2 |
| 7,032,749 B2 * | 4/2006 | Hochstetler et al. | 206/349 |
| D534,408 S * | 1/2007 | Sultan | D8/70 |
| D535,169 S * | 1/2007 | Sultan | D8/70 |
| D535,538 S * | 1/2007 | Sultan | D8/70 |
| D538,620 S * | 3/2007 | Sultan | D8/70 |
| 7,909,137 B2 * | 3/2011 | Green | 182/3 |
| D661,169 S * | 6/2012 | Tinius | D8/65 |
| D678,743 S * | 3/2013 | Tinius | D3/220 |
| 8,418,898 B2 * | 4/2013 | Carlsson et al. | 224/254 |
| 2002/0125157 A1 * | 9/2002 | Hochstetler et al. | 206/349 |
| 2006/0254897 A1 | 11/2006 | Hamisch et al. | |

* cited by examiner

CHAIN GUARD FOR A MOTOR-DRIVEN CHAIN SAW AND A CARRYING ARRANGEMENT THEREFOR

CROSS REFERENCE TO RELATED APPLICATION

This application claims priority of German patent application no. 10 2009 012 291.5, filed Mar. 11, 2009, the entire content of which is incorporated herein by reference.

BACKGROUND OF THE INVENTION

In various fields, in which motor-driven chain saws are used, it is necessary that operators while moving about are protected from injuries caused by the saw chain when the chain saw is not being used. A chain guard to cover the saw chain while the machine is not in use is already known from U.S. Pat. No. 3,344,818. Especially while handling top-handle saws, which are used while moving in tree tops and while climbing ropes, it is important that the operator does not come into contact with the sharp cutting elements of the saw chain and sustain injury.

SUMMARY OF THE INVENTION

It is an object of the invention to provide a chain guard for a motor-driven chain saw that is easier to manipulate for the operator and is configured so that the chain guard is attachable when it is taken off the motor-driven chain saw and is not lost.

The chain guard of the invention is for a motor-driven chain saw and includes: a narrow casing having front and back ends; the casing having two parallel side walls and upper and lower walls connecting the side walls to each other; the casing being closed at the front end thereof and defining an opening at the back end; and, a device on the casing for attaching the chain guard to a carrying arrangement.

For example, a clothing article of the operator of the motor-driven chain saw, a carrying belt or a climbing belt of the operator, a rope or a carabiner would be suitable as a carrying arrangement.

According to an advantageous embodiment of the invention, the arrangement comprises at least one hook. Here it is practical that a protrusion is formed on the hook so that a rope or carabiner introduced into the hook cannot become disengaged therefrom. An alternative embodiment of the arrangement provides that it comprises at least one loop or closed bracket.

The casing of the chain guard preferably is made of a plastic material. Furthermore it is advantageous, that the arrangement comprises the same plastic material and is implemented as one piece with the casing. In this way, the manufacture of the chain guard is simplified. Preferably the chain guard is a blow molded part wherein the various desired contours can be easily produced.

According to a further embodiment of the invention, inwardly directed arcuate or curved depressions, that form a clamping section, are provided on the side walls forward of the back end of the casing. In this way, the chain guard is already held on the guide bar when it is only partially pushed on, which further contributes to the safe handling of the chain guard.

Furthermore it is advantageous that divergent walls are arranged at the back end of the casing which form a funnel-like opening. Thus, when the chain guard is fully slid onto the guide bar, the claw stop on the motor-driven chain saw is also covered by the chain guard and the funnel-like configuration of the opening enables a simple and safe mounting.

In a further embodiment, it is advantageous that the side walls comprise at least two sections which are arranged in different planes and between which a step is present. As a result of the sections, the distance between the side walls varies, whereby the distance at the outer periphery of the chain guard is larger than at the center. This ensures that sufficient space is provided in the area of the saw chain and the cutting elements; whereas, in the area of the guide bar, the narrowed section ensures that the pivoting motion away from the longitudinal axis is limited. Further, through such an arrangement, an unnecessary wear of the chain guard is prevented. In order to secure the chain guard from an unintended shifting when mounted on the guide bar, a protrusion or hook is provided for an interlocking engagement onto the sprocket wheel cover of the motor-driven chain saw.

In addition to the previously mentioned embodiments of the device in the form of hooks, loops or brackets, the device can also comprise a sling or a hook-and-loop fastener (VELCRO). It is also possible to provide a combination of the different measures, that is, in addition to a hook or loop also a hook-and-loop fastener.

In a further embodiment of the invention it is preferable that the casing provides at least one releasable latch which can engage between the cutting teeth of the saw chain. According to a further embodiment of the chain guard, the casing comprises at least two telescopically slidable casing parts. Here it is practical that the mechanism provided with latches is arranged on the casing part which slides into the other casing part.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
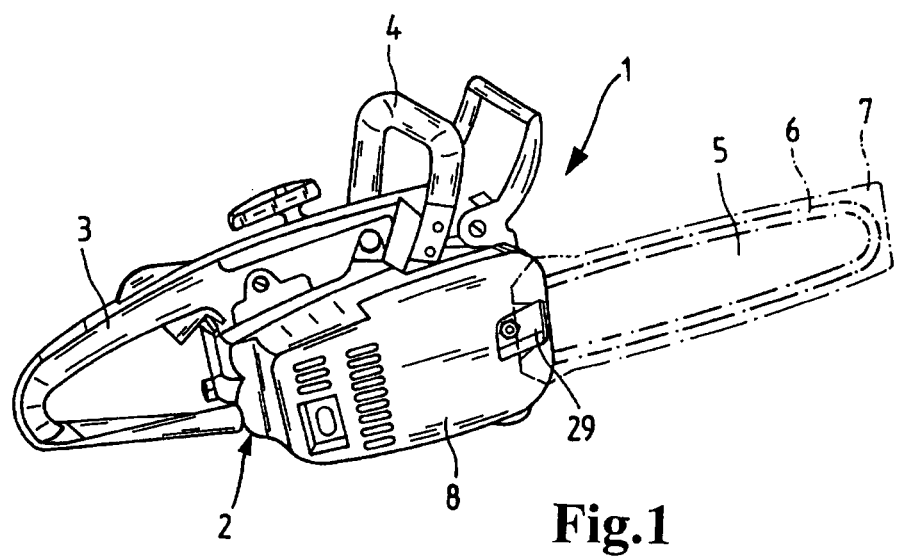
FIG. 1 shows a motor-driven chain saw with a chain guard.

FIG. 1 is a schematic showing a motor-driven chain saw 1 having a housing 2 in which the drive motor is mounted. The housing 2 is provided with handles 3 and 4 to guide the motor-driven chain saw 1. The motor-driven chain saw 1 has a guide bar 5 around which a saw chain 6 runs. When the motor-driven chain saw 1 is not in operation, the guide bar 5 and the saw chain 6 can be covered by a chain guard 7 to prevent injury to the operator. A sprocket wheel cover 8, which covers the drive sprocket and the segment of the saw chain running thereover, is arranged on the side of the housing 2. On the sprocket wheel cover 8, an opening 29 or a recess is arranged, into which a protrusion or hook (to be described later) of a chain guard can engage.

Figure 2:
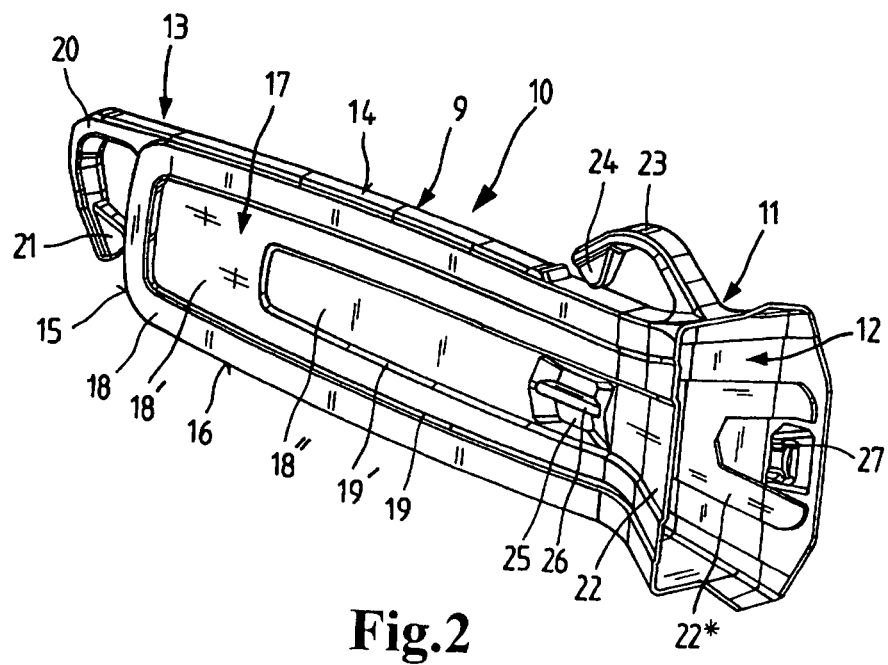
FIG. 2 is a perspective view of the chain guard.

FIG. 2 shows a chain guard 10 in the form of a narrow casing 9 in a perspective view. The chain guard 10, at a back end 11 of the longitudinal extension of the casing 9, has diverging walls (22, 22*) which form a funnel-like opening 12. The funnel-like opening 12 facilitates the insertion of the guide bar and covers also the claw stop disposed on the housing. At a front end 13 of its longitudinal extension, the chain guard 10 is closed. Parallel side walls 17, arranged at a sufficient spacing from one another to accommodate the guide bar with the saw chain, extend from the front end 13 up to the funnel-like opening 12. The side walls 17 are connected to one another via an upper wall section 14, a front wall section 15 and a lower wall section 16.

As can be seen from FIG. 2, the side wall 17 is comprised of sections (18, 18', 18") in different planes. Steps (19, 19') are formed between the sections (18, 18' and 18"). This configuration not only results in the spacing between the side walls 17 being slightly larger in the region of the saw, chain than in the region of the guide bar, but also imparts a greater mechanical stability to the side walls 17 and thereby the chain guard 10. Furthermore, in such a configuration, it is of special importance that the chain guard 10 permits only a small gap when mounted, whereby it can be avoided that other objects such as climbing ropes can get caught therein. The spacing of the side walls 17 between the sections 18 is so dimensioned that the saw chain does not laterally contact the sections 18 when the chain guard 10 is mounted and the sections 18' have a contour such that they do not lie in the area of the saw chain when the chain guard 10 is mounted, thereby preventing unnecessary wear of the chain guard.

At the front end 13 of the chain guard 10, the wall section 15 has a hook 20 formed thereon, which has an arcuate configuration and has a protrusion 21 directed toward the front wall section 15. The top side of the chain guard 10 also has a hook 23 formed thereon which extends up and forward in an arch-like manner from the diverging walls (22, 22*) toward the upper wall section 14. The hook 23 has a protrusion 24 directed toward the upper wall section 14 formed thereon. The hooks 20 and 23 serve to attach the unmounted chain guard 10 to a carrying arrangement, for example, a clothing article of an operator of the motor-driven chain saw, a rope, a carabiner or the like, while the protrusions (21, 24) contribute to the reliability of the attachment. The hooks (20, 23) have large bevels on their sides to improve hooking into a closed region, for example, when attaching the chain guard to a carabiner.

Forward of the diverging walls 22, inwardly directed arcuate depressions 25 are provided on each side wall 17 at the back end 11 in the section 18". The arcuate depressions conjointly define a clamping section which frictionally engages both sides of the guide bar. The inwardly directed arcuate depression 25 can be stiffened by a crosspiece 26 formed thereon. A protrusion 27 directed into the funnel-like opening 12 is provided on wall 22* and serves to lock into place behind a ledge on the sprocket wheel cover and engage the corresponding opening 29 in FIG. 1 when the chain guard is fully mounted on the guide bar. The chain guard 10 described above and shown in FIG. 2 is preferably manufactured as a blow molded part.

Figure 3:
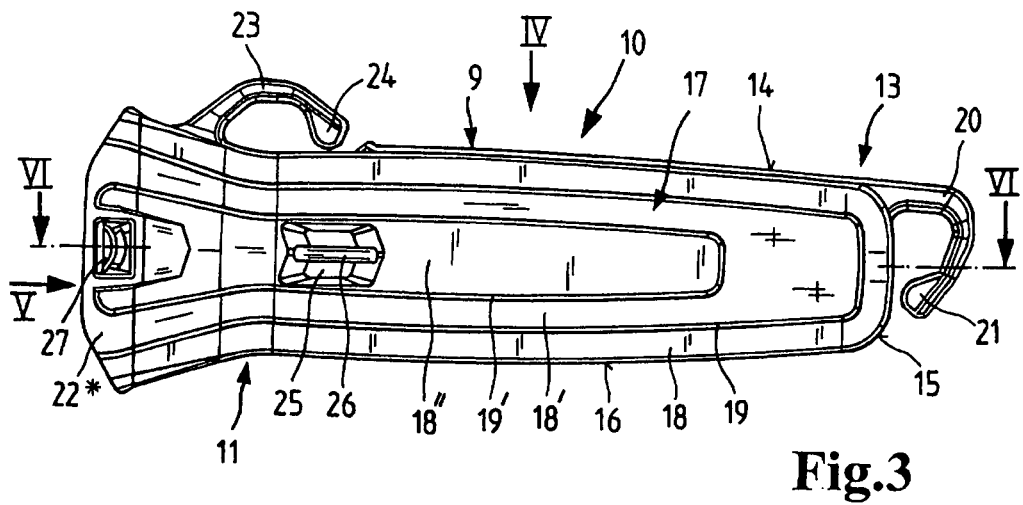
FIG. 3 is a side elevation view of the chain guard.

FIG. 3 shows a side elevation view of the chain guard 10, that is, a view onto the other side wall 17, which is the side facing away in FIG. 2 and from which the diverging wall 22* extends. This side wall 17 is configured as an exact mirror image of the side wall on the other side, also including the same sections (18, 18', 18") and steps (19, 19'). Likewise, the arcuate depressions 25 and the crosspiece 26 are present. As shown, the protrusion 21 has a certain spacing from the front wall section 15 and protrusion 24 has a certain spacing from the top wall section. These spacings can be increased by elastically deforming the hook 20 and hook 23, respectively, to attach or detach a fastening device such as a rope or carabiner. Further, the reference numbers are the same for the same parts as in FIG. 2.

Figure 4:
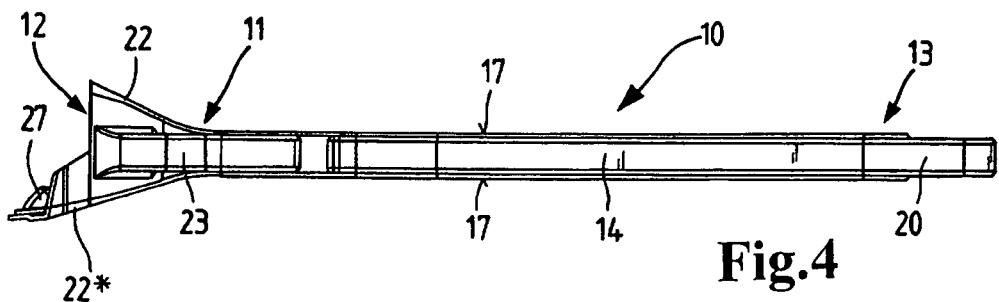
FIG. 4 is a view of the chain guard in the direction of arrow IV in FIG. 3.

In FIG. 4, a view of the chain guard 10 in the direction of arrow IV from FIG. 3 is shown. This shows that the side walls 17 run parallel to one another and are connected to each other via the upper wall section 14. The hook 20 is formed on the front end 13. The hook 23 is in the area of the back end 11 where the side walls 17 have diverging walls (22, 22*) formed thereon which form the funnel-like opening 12. A protrusion 27 is recognizable on the wall 22*. The contour of the opening 12 has been so selected to provide an optimal closure to the motor-driven chain saw.

Figure 5:
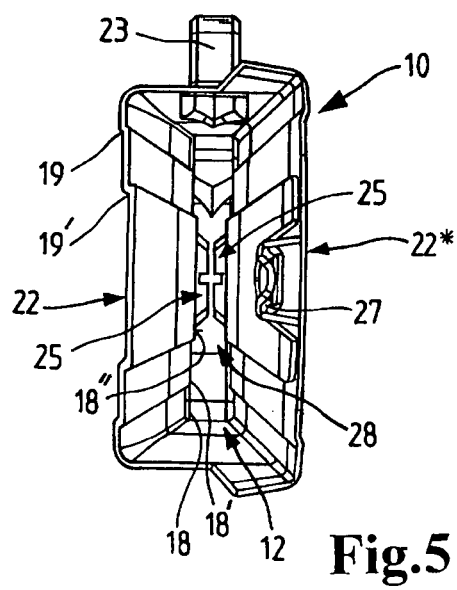
FIG. 5 is a view of the chain guard in the direction of arrow V in FIG. 3.

FIG. 5 shows a view of the chain guard 10 in the direction of the arrow V from FIG. 3. It can be seen that the side walls 17 have the inwardly stepped sections (18, 18', 18") via steps (19, 19'). Resulting herefrom is a narrowed section 28, which already has its beginning in the funnel-like opening 12, that is, at the diverging walls (22, 22*) so that a rotational movement out of the longitudinal axis is already avoided when the chain guard has been slid on a relatively short distance. Furthermore, FIG. 5 shows the inwardly directed arcuate depressions 25, whose distance from each other is less than the width of the guide bar so that there definitely is a frictional contact between the chain guard 10 and the guide bar, so that the chain guard 10 does not slide off the guide bar even when it is only partially mounted. Since the chain guard 10 is manufactured as a blow-molded part, the hooks (20, 23) shown in FIGS. 2 to 4 are hollow and for this reason elastic to permit a temporary deformation to hook into a loop on a clothing article of the operator, a rope or a carabiner.

Figure 6:
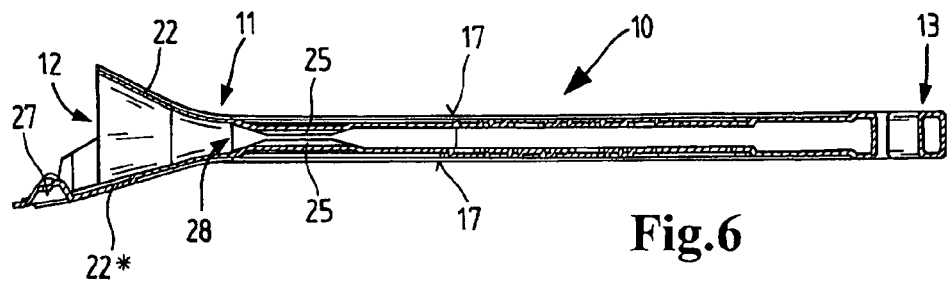
FIG. 6 is a section view along the line VI-VI in FIG. 3.

FIG. 6 shows a section view along the line VI-VI of FIG. 3. At the back end 11, as seen on the left-hand side of FIG. 3, the funnel-like opening 12, which is formed by the diverging walls (22, 22*), leads to the narrowed section 28 from which the region between the inwardly directed arcuate depressions 25 extends. The side walls 17 run parallel up to the front end 13 where the hook 20 with the protrusion 21 is located. The protrusion 27 is formed on the wall 22*. In the embodiment shown, the funnel-like opening 12 is formed between walls (22, 22*) with the same opening angle. Unsymmetrical arrangements are also possible, wherein attention should be paid to having a good covering of the claw. It can also be advantageous to configure the chain guard to be as flat as possible on the side of the sprocket wheel cover.

Figure 7:
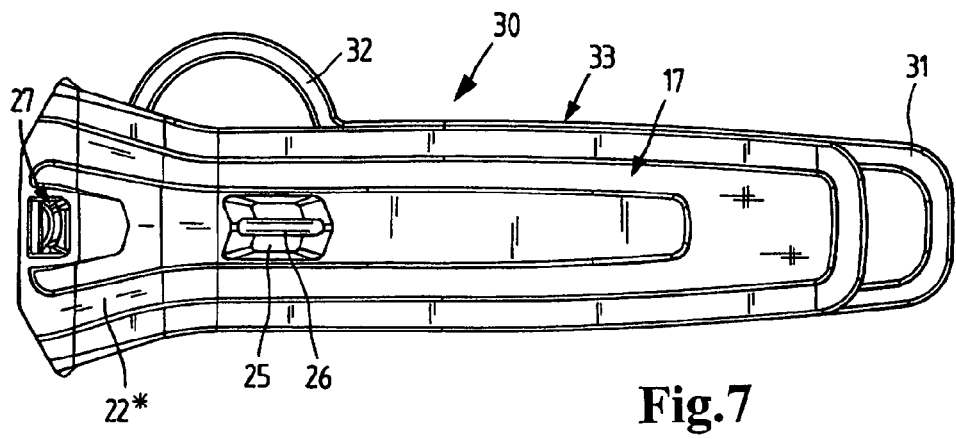
FIG. 7 is an alternate embodiment of the chain guard.

FIG. 7 shows an embodiment of the chain guard 30, in which the device for attaching the chain guard is configured as a loop or a closed bracket (31, 32). Such brackets can also be formed integrally with a casing 33, particularly when manufactured by a blow-molding process. The side walls 17 are configured as in FIGS. 2 and 3, the same applies to the opening 12. Otherwise, the configuration is in conformity with the configuration shown in FIGS. 2 to 6. The casing 33 of the chain guard 30 and the casing 9 of chain guard 10 can be reinforced at particularly stressed locations on the upper and lower wall sections, for example, where cutting members of the saw chain come into contact with the material of the casing. The reinforcement can be achieved by a thickening of the material or by inlay parts. The reinforced embodiment of the chain guard can be realized radially as well as axially, wherein it can be predetermined over what length the reinforcement should be implemented. The reinforcement can also be achieved by a two component blow-molding process, wherewith a wear-resistant material is provided inside.

In the above described embodiments of the chain guard 10 and 30, it is possible to provide one or more latches on the upper and lower wall sections of the casings (9, 33) which engage in the spaces between the cutting teeth and can be unlatched by the operator, for example, by clasping the casing (9, 33) in this region.

Figure 8:
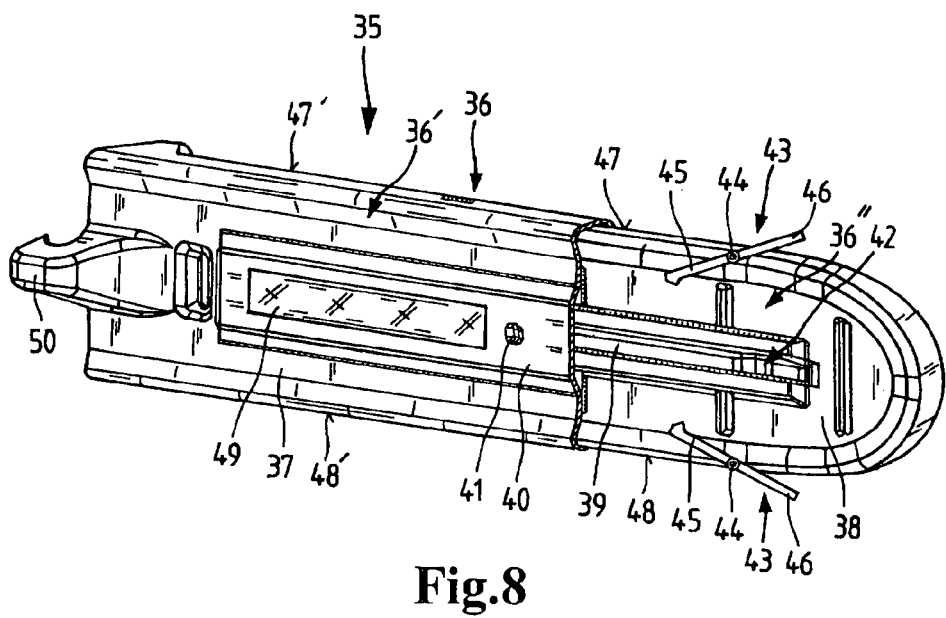
FIG. 8 is a perspective view of a telescopically adjustable chain guard.

In FIG. 8, a chain guard 35 is shown which has a casing 36, which consists of two casing parts (36', 36") telescopically sliding into one another. The casing parts (36', 36") have side walls (37, 38). A rod 39, running in a longitudinal direction, is arranged on the side wall 38 and is moved along with the casing part 36" and is accommodated in an elongated cover 40 of the side wall 37 when the casing part 36" is pushed in. A protrusion 41 is formed on the inside of the cover 40. The protrusion 41 engages a depression 42 on the rod 39 when a defined position of telescoping is reached. It is also possible to make the chain guard from more than two casing parts.

Latches 43 are provided on the casing part 36" which are configured as two-arm levers pivotable about a pivot axis 44. Each lever has an inner-lying arm 45 with an arrangement to engage the gaps between two cutting elements of a saw chain and an outer-lying arm 46 which protrudes above the contour of the upper and lower wall sections 47 and 48. While pushing the casing parts (36', 36") into each other, the upper and lower wall sections (47', 48') press the respective outer-lying arm toward the casing part 36", whereby the inner arms 45 are pivoted in the direction of the wall sections (47, 48) and the form fit with the cutting elements is released. In this way, the latches 43 are in a position that makes it possible to pull the chain guard 35 from the guide bar.

Additionally or alternatively it is also possible to position latches at a different location with respect to the length of the chain guard. The telescopic chain guard 35 can be secured by providing a path-dependent clamping on the guide bar and the clamping is activated when the chain guard 35 is pushed on. The rod 39 and the protrusion 41 accomplish this and the protrusion 41 presses the side wall 38 against the guide bar as a result of pressure on the rod 39 and the pressure is not relieved until the protrusion 41 projects into the depression 42. Then the chain guard 35 can be removed.

On the side wall 37, the surface of the cover 40 is provided with a hook-and-loop fastener (VELCRO fastener) 49 which serves to attach the chain guard 35, for example, to a clothing article of an operator. A hook 50 is arranged on the side wall 37 of the casing part 36' to engage the opening 29 on the sprocket wheel cover of the motor-driven chain saw as shown in FIG. 1.

Figure 9:
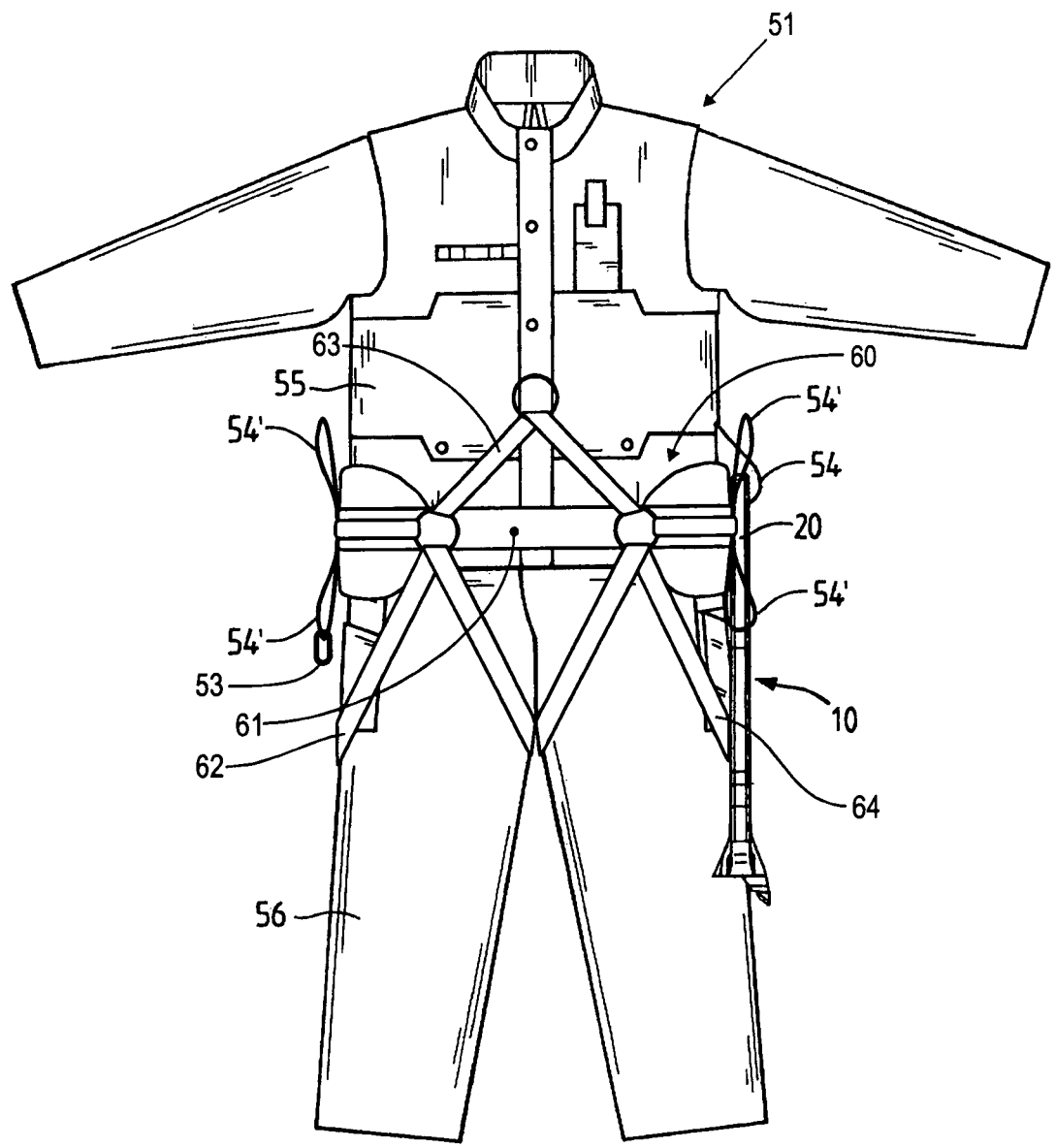
FIG. 9 shows a clothing piece of an operator's work apparel with a chain guard hanging therefrom.

In FIG. 9, a clothing article 51, which serves as work clothing for the operator of the motor-driven chain saw, is shown as consisting of a jacket 55 and a pair of pants 56. A loop 54 is provided on the jacket 55 into which the hook 20 of the chain guard 10 is hooked. In this manner the clothing article 51 serves as a carrying arrangement for the chain guard 10.

A climbing harness 60 or a carrying belt 61 worn by the operator can alternatively be provided to serve as a carrying arrangement in place of the clothing article 51. The climbing harness 60 and the carrying belt 61 advantageously have one or more carrying loops 54'. As shown by the example of the loop 54 on the clothing article 51, the chain guard can alternatively hook into the loops 54' of the climbing harness 60 or the carrying belt 61 with its hook 20, so that the operator has both hands free for his work in the tree with the motor-driven chain saw.

If the hook 20 of the chain guard 10 is closed (as shown in the embodiment according to FIG. 10), a carabiner 53 (FIG. 11), which is held in the carrying loop 54', can be used into which the hook 20 is to hook.

The climbing harness 60 shown in FIG. 9 consists essentially of a carrying belt 61 which is worn on the hip of the operator and is closed like a belt. The carrying belt 61, because of the addition of a chest strap 63 and leg straps 62 and 64, becomes a climbing harness 60, with which the operator can secure himself in the work position in the tree. The carrying loops 54' are preferably provided on the carrying belt 61; it can also be advantageous to not only provide the carrying belt 61, but additionally or alternatively also the chest strap 63 or the leg straps 62 and 64 with carrying loops, carrying ropes (FIG. 10), or carabiners 53 (FIG. 11).

Figure 10:
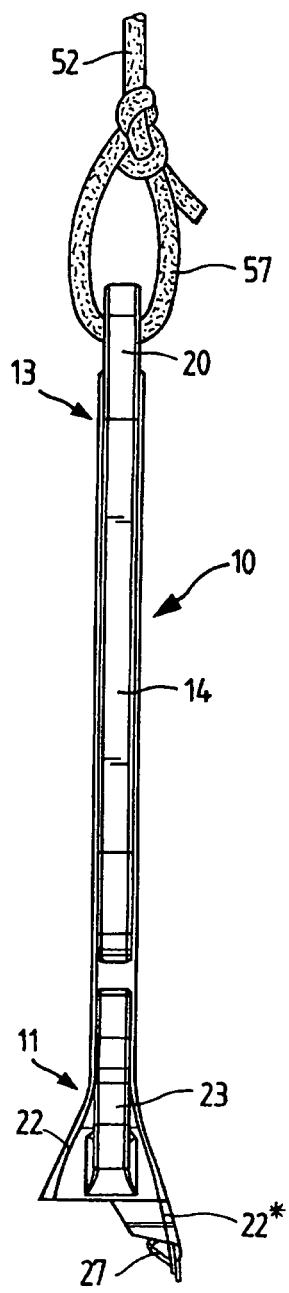
FIG. 10 is a view of a chain guard hanging from a rope.
Figure 11:
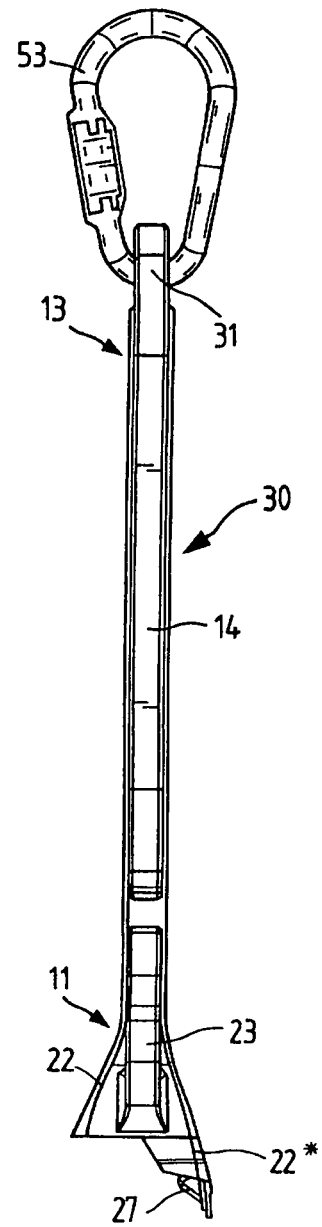
FIG. 11 is a chain guard hooked into a carabiner.

FIG. 10 shows a rope 52 serving as a carrying arrangement for the chain guard 10, wherein the rope has a loop 57 at one end, into which the hook 20 of the chain guard 10 is hooked. As shown in FIG. 11, a carabiner 53 is especially suited for hooking in the chain guard 30 with a closed bracket 31. Further, the reference characters are the same for the same respective parts in FIGS. 3, 4, 6, and 7.

It is understood that the foregoing description is that of the preferred embodiments of the invention and that various changes and modifications may be made thereto without departing from the spirit and scope of the invention as defined in the appended claims.

What is claimed is:

1. A chain guard for a motor-driven chain saw having a sprocket wheel cover, the chain guard comprising:
   a casing having front and back ends;
   said casing having two parallel side walls and upper and lower walls connecting said side walls to each other;
   said casing being closed at said front end thereof and defining a funnel-shaped opening at said back end;
   a device integral with said casing for attaching said chain guard to a carrying arrangement;
   said side walls having respective depressions arranged forward of said back end;
   said depressions forming respective mutually adjacent inwardly directed projections conjointly defining a clamping section therebetween;
   said side walls having diverging wall sections arranged at said back end of said casing configured to conjointly form said funnel-shaped opening;
   said chain guard including a protrusion or hook formed integrally with one of said side walls of said casing and projecting into said funnel-shaped opening to engage the sprocket wheel cover of the motor-driven chain saw;
   said casing of said chain guard being made of plastic; and,
   said device and said protrusion or hook being made of the same plastic as said casing.

2. The chain guard according to claim 1, wherein said device comprises at least one hook.

3. The chain guard according to claim 2, wherein said at least one hook has a protrusion formed thereon.

4. The chain guard according to claim 1, wherein said device comprises at least one closed bracket.

5. The chain guard according to claim 1, wherein the plastic of said casing is a blow-molded part.

6. The chain guard according to claim 1, wherein:
   said side walls are mutually adjacent and each of said side walls comprises at least first and second sections; said first sections conjointly define an outer periphery of said chain guard and are mutually separated by a first distance;

said first and second sections of each of said side walls are disposed in respectively different planes in stepped relationship to each other so as to cause the first sections of said side walls to be spaced apart by said first distance and the second sections of said side walls to be spaced apart a second distance different from said first distance with said first distance between said side walls at said periphery of said casing being greater than said second distance between said side walls at said second sections; and, said second sections conjointly define a mid region of said casing.

7. A combination of a chain guard and a guide bar for a motor-driven chain saw having a sprocket wheel cover, the combination comprising:

the chain guard including a casing having front and back ends;

said casing having two parallel side walls and upper and lower walls connecting said side walls to each other;

said casing being closed at said front end thereof and defining a funnel-shaped opening at said back end;

a device integral with said casing for attaching said chain guard to a carrying arrangement;

said side walls having respective depressions arranged forward of said back end in close proximity to said funnel-shaped opening;

said depressions forming respective mutually adjacent inwardly directed projections conjointly defining a gap therebetween;

said side walls having diverging wall sections arranged at said back end of said casing configured to conjointly form said funnel-shaped opening;

said chain guard including a protrusion or hook formed integrally with one of said side walls of said casing and projecting into said funnel-shaped opening to engage the sprocket wheel cover of the motor-driven chain saw;

said casing of said chain guard being made of plastic;

said device and said protrusion or hook being made of the same plastic as said casing;

the guide bar having a predetermined thickness; and, said projections being formed so as to cause said gap therebetween to be less than said thickness of said guide bar to permit a frictional contact between said chain guard and said guide bar sufficient to provide a clamping action to hold said chain guard in place on said guide bar.

8. A combination of a carrying arrangement and a chain guard for a motor-driven chain saw, the combination comprising:

the chain guard including a casing having front and back ends;

said casing having two parallel side walls and upper and lower walls connecting said side walls to each other;

said casing being closed at said front end thereof and defining a funnel-shaped opening at said back end;

the carrying arrangement being provided for holding said chain guard when work is performed with the motor-driven chain saw;

a device integral with said casing for attaching said chain guard to said carrying arrangement;

said side walls having respective depressions arranged forward of said back end;

said depressions forming respective mutually adjacent inwardly directed projections conjointly defining a clamping section therebetween;

said side walls having diverging wall sections arranged at said back end of said casing configured to conjointly form said funnel-shaped opening;

said chain guard including a protrusion or hook formed integrally with one of said side walls of said casing and projecting into said funnel-shaped opening to engage the sprocket wheel cover of the motor-driven chain saw;

said casing of said chain guard being made of plastic;

said device and said protrusion or hook being made of the same plastic as said casing; and, said carrying arrangement being configured to be worn by an operator of said motor-driven chain saw so as to permit said operator to have both hands free for working with said motor-driven chain saw when in a tree.

9. The combination according to claim 8, wherein said carrying arrangement includes an article of clothing and a rope arranged on said article of clothing.

10. The combination according to claim 8, wherein said carrying arrangement includes an article of clothing and a carabiner on said article of clothing worn by said operator of said motor-driven chain saw.

11. The combination according to claim 8, wherein said carrying arrangement includes a carrying belt worn by said operator and a rope on the carrying belt of the operator.

12. The combination according to claim 8, wherein said carrying arrangement includes a carrying belt worn by said operator and a carabiner on the carrying belt of the operator.

13. The combination according to claim 8, wherein said carrying arrangement includes a carrying belt worn by said operator and a carrying loop on the carrying belt of the operator.

14. The combination according to claim 8, wherein said carrying arrangement includes an article of clothing of said operator and a carrying loop on said article of clothing.

15. A combination of a carrying arrangement and a chain guard for a motor-driven chain saw, the combination comprising:

the chain guard including a casing having front and back ends;

said casing having two parallel side walls and upper and lower walls connecting said side walls to each other;

said casing being closed at said front end thereof and defining an opening at said back end;

the carrying arrangement being provided for holding said chain guard when work is performed with the motor-driven chain saw;

a device on said casing for attaching said chain guard to said carrying arrangement;

said side walls having respective depressions arranged forward of said back end;

said depressions forming respective mutually adjacent inwardly directed projections conjointly defining a clamping section therebetween;

said side walls having diverging wall sections arranged at said back end of said casing configured to conjointly form a funnel-shaped opening;

said chain guard including a protrusion or hook formed integrally with one of said side walls of said casing and projecting into said funnel-shaped opening to engage the sprocket wheel cover of the motor-driven chain saw;

said casing of said chain guard being made of plastic;

said device and said protrusion or hook being made of the same plastic as said casing; and, said carrying arrangement including a climbing harness worn by an operator of said motor-driven chain saw so as to permit the operator to have both hands free for working with said motor-driven chain saw when in a tree.

16. The combination according to claim 15, wherein said carrying arrangement further includes a rope on the climbing harness of the operator.

17. The combination according to claim 15, wherein said carrying arrangement further includes a carabiner on the climbing harness of the operator.

18. The combination according to claim 15, wherein said carrying arrangement further includes a carrying loop on the climbing harness of the operator.

* * * * *